US007281067B2

(12) United States Patent
Chen

(10) Patent No.: US 7,281,067 B2
(45) Date of Patent: Oct. 9, 2007

(54) KVM SWITCH CABLE FOR PS/2 AND USB SIGNALING

(75) Inventor: Sun-Chung Chen, Hsi Chih (TW)

(73) Assignee: Aten International Co., Ltd. (TW)

( * ) Notice: Subject to any disclaimer, the term of this patent is extended or adjusted under 35 U.S.C. 154(b) by 444 days.

(21) Appl. No.: 10/813,066

(22) Filed: Mar. 31, 2004

(65) Prior Publication Data

US 2005/0138245 A1 Jun. 23, 2005

(30) Foreign Application Priority Data

Dec. 22, 2003 (TW) .............................. 92222430 U

(51) Int. Cl.
*G06F 13/12* (2006.01)
*G06F 3/00* (2006.01)
*G06F 1/16* (2006.01)
*G05B 11/01* (2006.01)

(52) U.S. Cl. ................... 710/62; 710/2; 710/5; 710/63; 710/72; 361/683; 700/683

(58) Field of Classification Search .................... 710/2, 710/5, 62, 63, 72; 700/19; 361/683
See application file for complete search history.

(56) References Cited

U.S. PATENT DOCUMENTS 6,609,034 B1 * 8/2003 Behrens et al. ............... 700/19
6,671,756 B1 * 12/2003 Thomas et al. ............... 710/73
7,035,112 B2 * 4/2006 Chen .......................... 361/752
2002/0084988 A1 * 7/2002 Kuo ........................... 345/168
2003/0188049 A1 * 10/2003 Dickens ......................... 710/8
2004/0088468 A1 * 5/2004 Hasegawa ................... 710/313
2005/0066000 A1 * 3/2005 Liaw et al. ................. 709/204

* cited by examiner

*Primary Examiner*—Alan S. Chen
(74) *Attorney, Agent, or Firm*—Rabin & Berdo, PC

(57) ABSTRACT

A KVM switch cable is described. The KVM switch cable transmits and converts signals between a USB interface and a PS/2 interface for a computer and a KVM switch. Therefore, the life-span and application scope of the KVM switch with PS/2 interfaces can be efficiently extended. The KVM switch cable has a set of computer connectors, a transmitting cable, and a combination connector, and further has a signal converting device installed in the set of computer connectors or the combination connector. The transmitting cable can transmit video signals of the computer to the KVM switch, mouse and keyboard signals to the computer, and can further simultaneously transmit microphone signals and speaker signals for the computer and the KVM switch.

21 Claims, 3 Drawing Sheets

KVM SWITCH CABLE FOR PS/2 AND USB SIGNALING

FIELD OF THE INVENTION

The present invention relates to a KVM switch cable, and especially, to a KVM switch cable for transmitting keyboard, mouse, and video signals and exchanging PS/2 signals and USB signals.

BACKGROUND OF THE INVENTION

The wide proliferation of personal computers and networks allows people to utilize the networks to search for and provide information. Currently, network requests are higher, and network-related enterprises have to buy large numbers of computers and network equipments to satisfy user requests. For example, Internet service providers and virtual host providers need to buy a lot of server computers to rent to users. Because these providers may supply a fast network environment, a lot of companies are willing to rent their server computers. The management and trouble shooting of these computers may become an important link. A larger server computer provider has thousands of server computers. Control of each of these computers requires a monitor, a keyboard and a mouse. Actually, each of these computers spends little time on the monitor, keyboard and mouse. Most of the time, the server computers need no peripheral devices for control. Control of every computer with a set of these peripheral devices incurs high operation costs and is not necessary. Such peripheral devices also waste space. In resolution of these problems, a KVM (Keyboard, Video, and Mouse) switch connected with a monitor, a keyboard and a mouse is utilized to control a plurality of server computers.

However, due to development in electrical technology, computer products progress and change with each passing day. Conventionally, a PS/2 interface is utilized to couple to a keyboard and a mouse for computer control. Nowadays, the PS/2 interface is replaced with a universal serial bus (USB) interface for new generation computers. Some computers, such as computers made by Sun or Apple, may not support PS/2 interface. Therefore, server computer administrators must buy new KVM switches with USB interface to control the new generation computers and special computers with USB interface but without PS/2 interface.

Accordingly, the hardware cost for controlling the server computers and the control complexity are both increased. The server computer administrators have to separate the computers without PS/2 interfaces from the computers with PS/2 interface. Furthermore, if a computer has both PS/2 and USB interfaces but the PS/2 interface is occupied by a local device, the server computer administrator still has to connect the computer to a KVM switch with USB interface for computer control. Such a server computer management method not only increases the control complexity but also requires that the conventional computers be phased out sooner. Therefore, the facility investment is increased, convenient server computer control is lost, and the management cost is also increased when the old computer is replaced with the new generation computer.

SUMMARY OF THE INVENTION

It is an object of the present invention to provide a KVM switch cable to exchange PS/2 signals and USB signals for mouse and keyboard so that a KVM switch without USB interfaces can still control a computer via the USB interface of the computer.

It is another object of the present invention to provide a KVM switch cable having a combination connector to extend the life-span of a conventional KVM switch and be convenient to control the server computers so that the management cost for controlling the server computers is reduced and the management efficiency is therefore improved.

To accomplish the above objectives, the present invention provides a KVM switch cable for connecting a computer to a KVM switch. The KVM switch cable has a set of computer connectors, a cable, and a combination connector.

The set of computer connectors connect to the computer and includes a USB connector using a signal converting device therein to convert USB signals into PS/2 signals and vice versa. The cable is connected between the set of computer connectors and the combination connector to transmit signals between the KVM switch and the computer. The combination connector receives video signals from the computer and transmits the same to the KVM switch. Simultaneously, PS/2 keyboard signals and PS/2 mouse signals from the KVM switch are also transmitted to the computer via the cable and are converted into USB keyboard signals and USB mouse signals to control the computer. The signal converting device can be configured in either the USB connector or the combination connector to convert the PS/2 signals and the USB signals.

The set of computer connectors has a monitor connector, e.g. a standard VGA (Video Graphics Array) HDB (High density D sub) 15 connector, and further has a speaker connector to transmit audio signals for a speaker and a microphone connector to transmit audio signals for a microphone. A preferred USB connector is a type A USB connector.

The combination connector has a 15-pin computer connector, e.g. a standard VGA HDB 15 connector or a special high density D sub 15 (SPHDB 15) connector with a perpendicular angle and a tilt angle. The combination connector can also utilize a standard SCSI connector to transmit keyboard, video, and mouse signals.

The KVM switch cable according to the present invention utilizes one cable to transmit signals between the computer and the KVM switch, and further convert USB into PS/2 signals and vice versa. Therefore, the KVM switch with PS/2 interfaces can easily control a computer with a USB interface. Hence, the life-span of a KVM switch with the PS/2 interface can be extended. Furthermore, a KVM switch with the USB interface can also control the computer with the PS/2 interface. Accordingly, the server computer can be controlled more conveniently and the hardware cost for the computer upgrade can be reduced.

BRIEF DESCRIPTION OF THE DRAWINGS

The foregoing aspects and many of the attendant advantages of this invention are more readily appreciated as the same becomes better understood by reference to the following detailed description, when taken in conjunction with the accompanying drawings, wherein.

DETAILED DESCRIPTION OF THE PREFERRED EMBODIMENT

Figure 1:
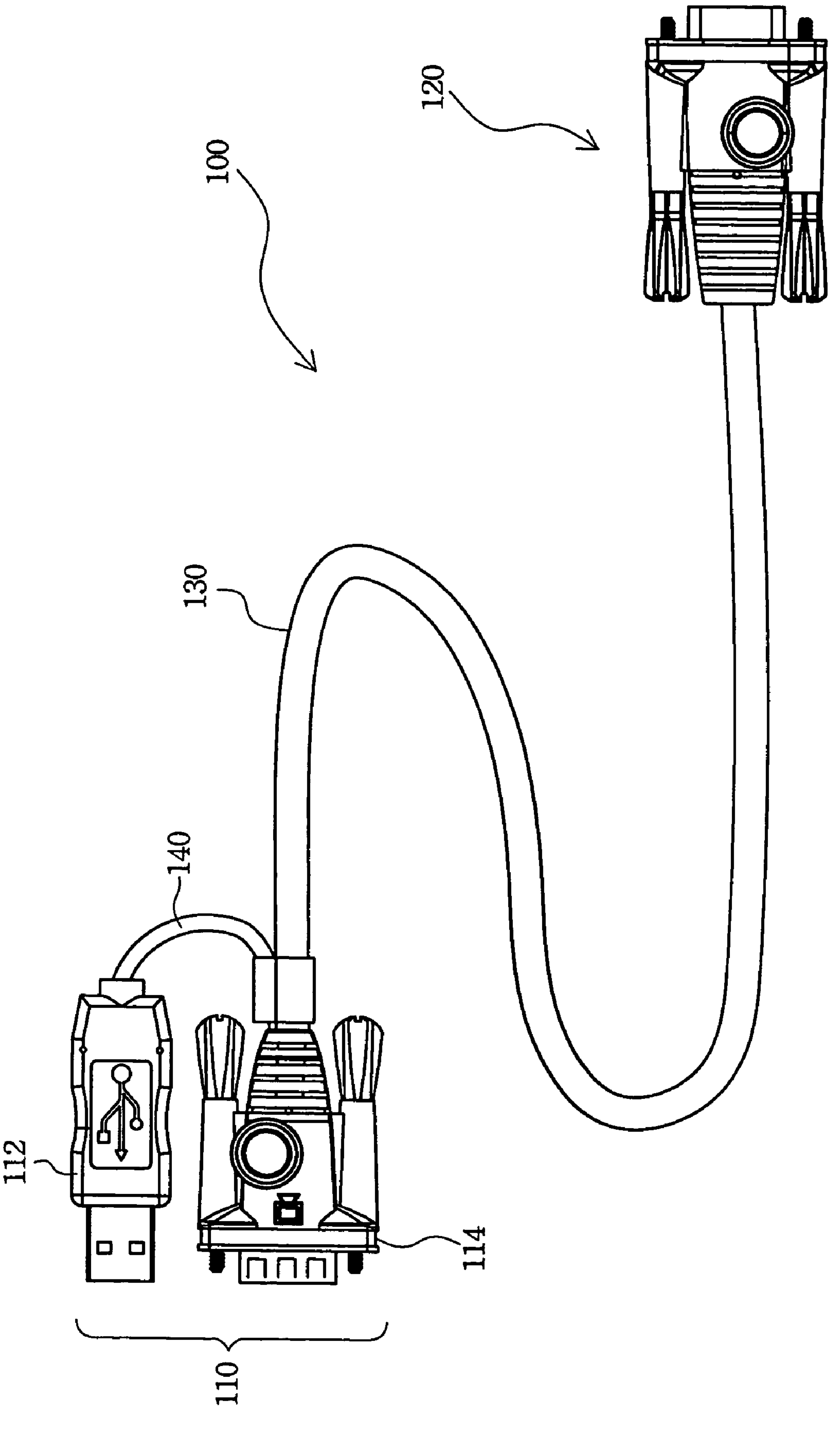
FIG. 1 is a schematic diagram of a KVM switch cable according to the present invention.

FIG. 1 is a schematic diagram of a KVM switch cable according to the present invention. The KVM switch cable 100 has a set of computer connectors 110, a combination connector 120, and a first transmitting cable 130. The set of computer connectors 110 is utilized to couple to input/output interfaces of a mouse, a keyboard, and a monitor of a computer, receive signals from the computer, and transmit signals to the combination connector 120 via the first transmitting cable 130. The combination connector 120 is coupled to an interface of a KVM switch, and transmits the signals from the first transmitting cable 130 to the KVM switch. The KVM switch also utilizes the first transmitting cable 130 to transmit commands ordered by a server computer administrator, from the combination connector 120 to the set of computer connectors 110, and to control the computer connected with the set of computer connectors 110.

A conventional KVM switch without USB interfaces is gradually phased out while the PS/2 interfaces are replaced with the USB interfaces, the new standard input/output interfaces for the new generation computers. However, in the period where the conventional computers are being replaced, some computers still have no USB interfaces and computers have to be controlled by a conventional KVM switch.

Some computers, the new generation computers or the computers without PS/2 interfaces, cannot support the PS/2 interface and these computers needs a new KVM switch with a USB interface. As a result, server computer management is then more complicated. The server computer administrator has to separate computers without PS/2 interfaces from computers with PS/2 interfaces. Hence, the server computer management and hardware cost are therefore increased.

The set of computer connectors 110 of the KVM switch cable 100 according to the present invention includes at least one USB connector 112. The USB connector 112 can convert PS/2 mouse and keyboard signals from the first transmitting cable 130 and the second transmitting cable 140 into USB signals for the USB interface of the server computer to control the server computer. Simultaneously, the VGA connector 114 and the first transmitting cable 130 transmit video signals of the server computer to the combination connector 120 for the KVM switch.

The KVM switch cable according to the present invention integrates the server computers having PS/2 interfaces or having USB interfaces with a conventional KVM switch having only PS/2 interfaces. Therefore, the life-span of the conventional KVM switch is extended and the application scope of the conventional KVM switch is also extended. The convention KVM switch needs only one KVM switch cable according to the present invention to control a server computer with USB interfaces so that a conventional KVM switch can simultaneously control the conventional computer and the new generation computer. The new and old server computers can be conveniently controlled by the server computer administrator with only one conventional KVM switch so as to reduce the hardware cost and server computer management cost for a company while upgrading with the new generation computers.

Figure 2:
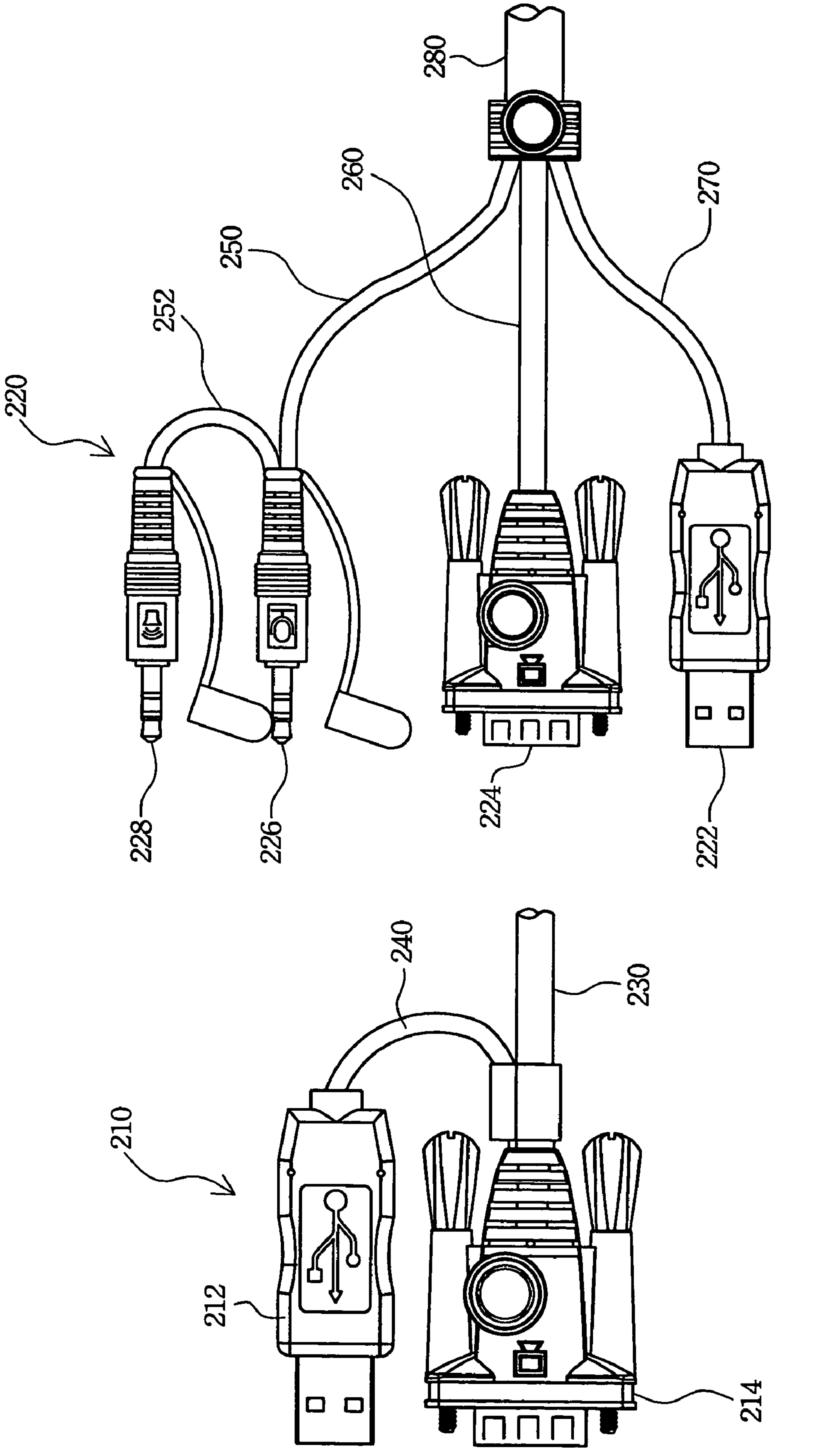
FIG. 2 is a schematic diagram illustrating preferred embodiments of the set of computer connectors of the KVM switch cable according to the present invention.

FIG. 2 is a schematic diagram illustrating preferred embodiments of the set of computer connectors of the KVM switch cable according to the present invention. The KVM switch cable utilizes a set of computer connectors for coupling to the server computer. Referring to FIG. 2, a preferred embodiment is illustrated with a set of computer connectors 210, and another preferred embodiment is illustrated with a set of computer connectors 220. The set of computer connectors 210 includes a VGA connector 214 and a USB connector 212. The VGA connector 214 is a standard connector for monitor such as, for example, a standard connector of VGA HDB15, and the USB connector 212 is preferably a standard USB connector such as, for example, a type A USB connector. When the USB connector 212 receives the mouse and keyboard PS/2 signals from the KVM switch via the second transmitting cable 240, the USB connector 212 directly converts the mouse and keyboard PS/2 signals into USB signals to control the server computer. Simultaneously, the VGA connector 214 transmits the video signals to the KVM switch via the first transmitting cable 230.

The set of computer connectors 220 includes a USB connector 222, a VGA connector 224, a microphone connector 226, and a speaker connector 228. The VGA connector 224 and the USB connector 222 are both standard connectors. The set of computer connectors 220 further utilizes the microphone connector 226 and the speaker connector 228 to transmit audio signals to the KVM switch and the server computer via the first transmitting cable 280. The server computer administrator controls the server computer via the KVM switch cable and also transmits the audio and video signals via the KVM switch cable. Hence, a multimedia computer can be efficiently controlled by the KVM switch via the KVM switch cable according to the present invention.

A fifth transmitting cable 252 is utilized to couple speaker connector 228 to the microphone connector 226. A fourth transmitting cable 250, a second transmitting cable 260 coupled to the VGA connector 224, and a third transmitting cable 270 coupled to the USB connector 222 combine together into the first transmitting cable 280 and transmit the signals thereof to the KVM switch via the first transmitting cable 280.

Figure 3:
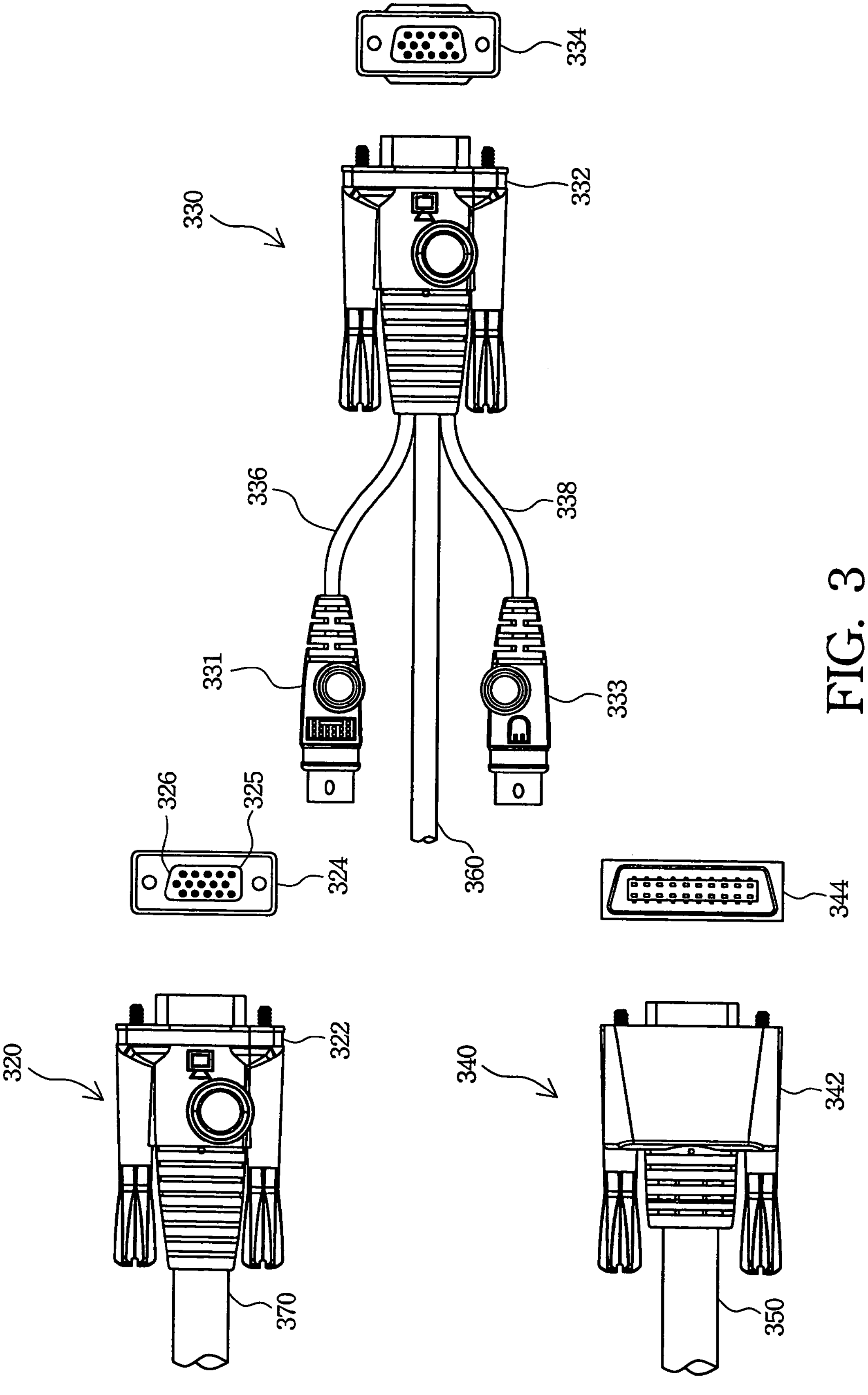
FIG. 3 is a schematic diagram illustrating preferred embodiments of the combination connector of the KVM switch cable according to the present invention.

FIG. 3 is a schematic diagram illustrating preferred embodiments of the combination connector of the KVM switch cable according to the present invention. The other end of the KVM switch cable according to the present invention is a combination connector to couple to the KVM switch. Referring to FIG. 3, three preferred embodiments of the combination connector 320, 330, and 340 are illustrated. The combination connector 320 comprises a 15 pin connector such as, for example, a standard VGA HDB 15 connector or a SPHDB connector 322. Referring to the front view 324 of the SPHDB connector 322, the SPHDB connector 322 has a perpendicular angle 325 and a tilt angle 326 to prevent the SPHDB connector 322 from being inserted in reverse or into the VGA connector. The combination connector 320 couples to the first transmitting cable 370 to receive the video and/or audio signals from the server computer and further transmit the mouse, keyboard and/or microphone signals to the server computer for controlling the server computer.

The combination connector 330 has a VGA connector 332, a keyboard connector 331, and a mouse connector 333. The keyboard connector 331 utilizes a keyboard cable 336 to couple to the first transmitting cable 360, and the mouse connector 333 utilizes a mouse cable 338 to couple to the first transmitting cable 360. Therefore, the video signals from the first transmitting cable 360 are directly transmitted to the KVM switch via the VGA connector 332. The mouse signals from the mouse connector 333 through the mouse cable 338, and the keyboard signals from keyboard connector 331 through the keyboard cable 336 are integrated to transmit via the first transmitting cable 360 for controlling the server computer.

The VGA connector 332 is a standard VGA connector such as, for example, a standard VGA HDB15 connector. A front view 334 illustrates a schematic front diagram of the VGA connector 332. The keyboard connector 331 and the mouse connector 333 are both standard PS/2 connectors.

The combination connector 340 utilizes a SCSI connector 342 to couple to the first transmitting cable 350 for transmitting signals. A front view 344 illustrates a schematic front diagram of the SCSI connector 342.

The USB connector of the KVM switch cable according to the present invention utilizes a signal converting device therein to convert USB signals and PS/2 signals to each other. They signal converting device has a compact size such as, for example, a signal converting device constructed by a semiconductor chip. Therefore, the signal converting device can be configured in any place of the KVM switch cable to exchange the signals. For example, the signal converting device can be configured in the USB connector or the combination connector and the KVM switch cable need not increase the appearance dimensions and volume thereof.

The foregoing preferred embodiments illustrate only part of the preferred embodiments of the set of computer connectors and the combination connectors. The set of computer connectors and the combination connector are not limited to the preferred embodiments. The set of computer connectors and the combination connector can be any connectors that can couple to connectors of the server computer or the KVM switch.

The KVM switch cable according to the present invention utilizes a single cable to connect the server computer and the KVM switch so that the cable between the server computer and the KVM switch can be efficiently reduced. The KVM switch cable further utilizes a signal converting device configured in the USB connector to exchange PS/2 signals and USB signals so that the computer with the USB interface can be controlled by the KVM switch with the PS/2 interface. The KVM switch cable promotes the KVM switch with the PS/2 interface to a KVM switch with both the PS/2 interface and the USB interface. Therefore, the KVM switch can not only control a computer with a PS/2 interface but also a computer with a USB interface so that the application scope of the KVM switch and the life-span thereof are both efficiently extended. The KVM switch cable efficiently reduces the hardware cost and server computer management cost.

The KVM switch cable provides the KVM switch with PS/2 interface to control the computer with a USB interface. Hence, the conventional KVM switch can efficiently control computers with different interfaces. The KVM switch cable can also be utilized to control a computer with a PS/2 interface by a KVM switch with the USB interface so that the KVM switch can efficiently and conveniently control computers having various interfaces.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. A KVM switch cable for connecting a computer to a KVM switch, the KVM switch cable comprising:
- a transmitting line;
- a set of computer connectors connecting between the computer and the transmitting line, the set of computer connectors comprising:
- a USB connector for transmitting USB signals
- a combination connector connecting between the KVM switch and the transmitting line to transmit keyboard signals, mouse signals, and video signals; and
- a signal converting device integrated in one of the USB connector, the combination connector and the transmitting line, the signal converting device converting PS/2 signals into USB signals.

2. The KVM switch cable of claim 1, wherein the set of computer connectors further comprises a monitor connector.

3. The KVM switch cable of claim 2, wherein the monitor connector is a standard VGA HDB 15 connector.

4. The KVM switch cable of claim 2, wherein the set of computer connectors further comprises a speaker connector to transmit audio signals for a speaker.

5. The KVM switch cable of claim 2, wherein the set of computer connectors further comprises a microphone connector to transmit audio signals for a microphone.

6. The KVM switch cable of claim 1, wherein the USB connector is a standard type A USB connector.

7. The KVM switch cable of claim 1, wherein the combination connector comprises a 15-pin connector.

8. The KVM switch cable of claim 7, wherein the 15-pin connector is a standard VGA HDB 15 connector.

9. The KVM switch cable of claim 7, wherein the 15-pin connector is a special high density connector with a perpendicular angle and a tilt angle.

10. The KVM switch cable of claim 7, wherein the combination connector further comprises a PS/2 connector.

11. The KVM switch cable of claim 1, wherein the combination connector comprises a standard SCSI connector.

12. A KVM switch cable for connecting a computer to a KVM switch, the KVM switch cable comprising:
- a transmitting line;
- a set of computer connectors for connecting between the computer and the transmitting line, the set of computer connectors comprising a PS/2 connector;
- a combination connector connecting between the KVM switch and the transmitting line to transmit keyboard signals, mouse signals, and video signals; and
- a signal converting device integrated in one of the PS/2 connector, the combination connector and the transmitting line, the signal converting device converting USB signals into PS/2 signals.

13. The KVM switch cable of claim 12, wherein the combination connector comprises a USB connector.

14. The KVM switch cable of claim 12, wherein the set of computer connectors comprises a standard VGA HDB 15 connector.

15. The KVM switch cable of claim 14, wherein the set of computer connectors further comprises a speaker connector to transmit audio signals for a speaker and a microphone connector to transmit audio signals for a microphone.

16. The KVM switch cable of claim 12, wherein the combination connector comprises a 15-pin connector.

17. The KVM switch cable of claim 16, wherein the 15-pin connector is a standard VGA HDB 15 connector or a special high density connector with a perpendicular angle and a tilt angle.

18. The KVM switch cable of claim 12, wherein the combination connector comprises a standard SCSI connector.

19. The KVM switch cable of claim 12, wherein the set of computer connectors further comprises a monitor connector.

20. The KVM switch cable of claim 19, wherein the set of computer connectors further comprises a speaker connector to transmit audio signals for a speaker.

21. The KVM switch cable of claim 19, wherein the set of computer connectors further comprises a microphone connector to transmit audio signals for a microphone.

* * * * *